March 31, 1959 L. H. GERNERT ET AL 2,880,280

MULTIPLE MAGNETIC TRANSDUCING HEAD WITH MOUNTING AND ADJUSTMENT MEANS

Filed Oct. 18, 1954 3 Sheets-Sheet 1

INVENTORS:
FRANKLIN M. RADDIN
LAWRENCE H. GERNERT
BY William L. Glover
AGENT

March 31, 1959 L. H. GERNERT ET AL 2,880,280
MULTIPLE MAGNETIC TRANSDUCING HEAD WITH
MOUNTING AND ADJUSTMENT MEANS
Filed Oct. 18, 1954 3 Sheets-Sheet 2

INVENTORS:
FRANKLIN M. RADDIN
LAWRENCE H. GERNERT
BY William L. Glover
AGENT

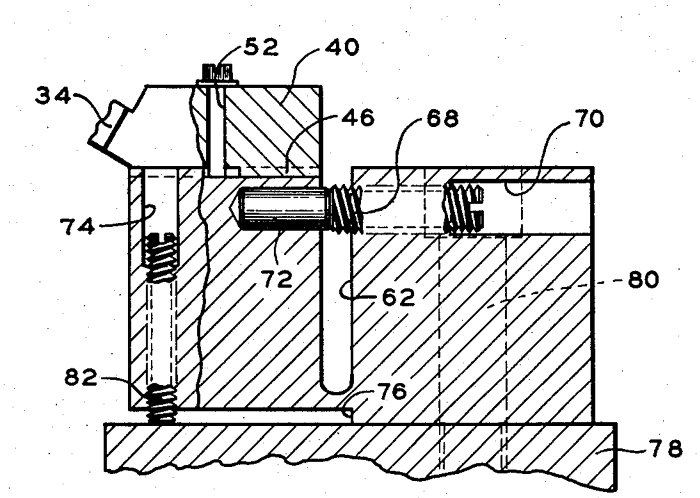
Fig. 5
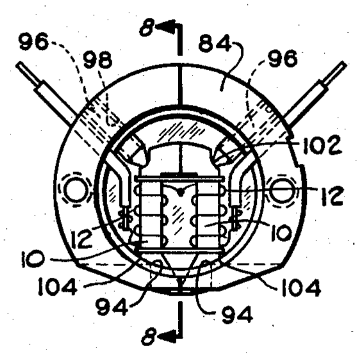
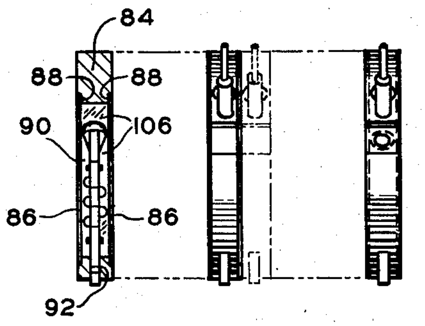
Fig. 6 Fig. 8
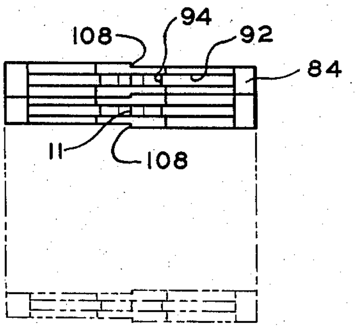
Fig. 7
INVENTORS:
FRANKLIN M. RADDIN
LAWRENCE H. GERNERT
BY William L. Glover
AGENT United States Patent Office 2,880,280

Patented Mar. 31, 1959

2,880,280

MULTIPLE MAGNETIC TRANSDUCING HEAD WITH MOUNTING AND ADJUSTMENT MEANS

Lawrence H. Gernert, Chatham, and Franklin M. Raddin, Morristown, N.J., assignors to Monroe Calculating Machine Company, Orange, N.J., a corporation of Delaware Application October 18, 1954, Serial No. 462,733

19 Claims. (Cl. 179—100.2)

This invention relates to magnetic recording and more particularly to a novel magnetic transducing head and adjustable means therefor.

The use of magnetic drums, and the like, have created a need for a magnetic transducing head capable of being ganged for mounting as an assembly in position to cooperate with the recording medium. Heretofore the width of transducing heads suitable for parallel mounting relative to a drum have made it necessary to interlace the heads of a plurality of head assemblies to obtain a reasonable degree of recording channel density. This interlacing, of course, requires expensive precise mounting means for the heads to avoid interference between the heads of the several interlaced assemblies.

The need for thinner heads, capable of being assembled at closer spacing, has been met to some extent by potting the magnetic components of a plurality of heads in a plastic block. This construction, however, is unsatisfactory in that a faulty head cannot be replaced but rather the entire assembly of heads may have to be replaced. Also, it is not possible to vary the capacity of a head assembly to fit various applications.

An additional problem has arisen in prior attempts to decrease the spacing between adjacent transducing heads, namely, adjacent heads have interfered with one another magnetically making it necessary to shield each head from its neighbors.

The principal object of the invention, therefore, is the provision of a novel transducing head capable of being ganged at an extremely fine spacing, yet providing adequate shielding between adjacent heads and facilitating ready replacement of faulty heads and changes in the capacity of an assembly.

The use of magnetic drum systems, or the like, wherein the transducing heads are not placed in contact with the recording medium, but rather are spaced an extremely short distance away from the same, has created a need for simple yet accurately adjustable mounting means for transducing heads whereby a desired spacing of the latter from the recording medium is readily obtained.

The ganging of heads has lent added difficulty to locating the same at a desired distance from the recording medium with which they are to cooperate as it is necessary also to insure parallelism between the heads and the said surface. Again, a simple mounting means accurately adjustable to this end is needed.

Another object of the invention is the provision of simple mounting means which is particularly adapted to the ganged heads of the invention, which means are capable of accurate adjustment to insure parallelism between a head assembly and the recording medium with which they are associated and to space the heads at a desired distance from the said medium.

Other objects and features of the invention will become apparent from the following description when read in the light of the attached drawings, of which:

Fig. 5 is a fragmentary sectional view taken on line 5—5 of Fig. 1;

Fig. 6 is a side elevation of a modified form of the head of the invention;

Fig. 7 is a plan view of a plurality of the heads of Fig. 6 assembled together; and, Fig. 8 is a partially diagrammatic sectional view taken on line 8—8 of Fig. 6.

Figure 1:
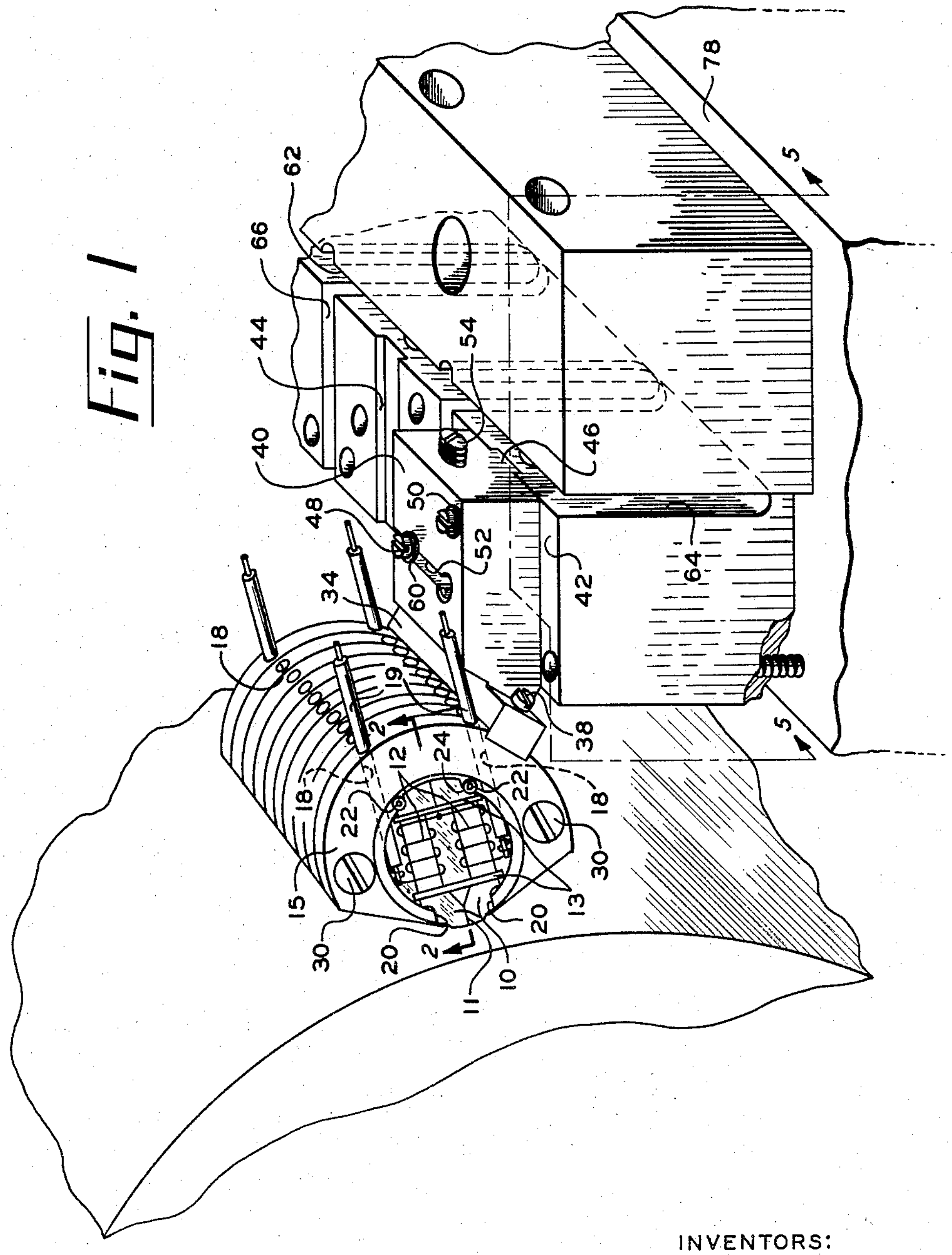
Fig. 1 is a fragmentary isometric view illustrating heads of the invention and the adjustable mounting means therefor.
Figure 2:
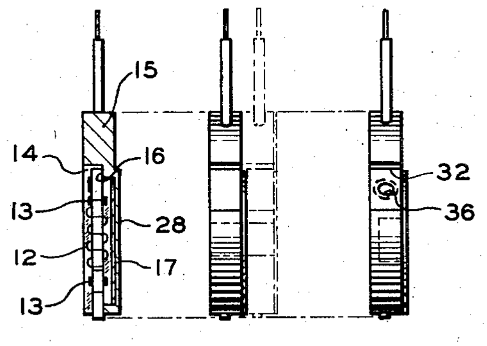
Fig. 2 is a partially diagrammatic sectional view taken on line 2—2 of Fig. 1.

Referring to Fig. 1 a magnetic transducing head constructed in accordance with the invention comprises a pair of oppositely disposed approximately C-shaped ferrite cores 10 having their one ends abutting and their other ends separated by a thin non-magnetic shim 11. Preferably the shim 11 is silver and is of the order of .001 of an inch thick. Serially connected coils 12 are wound on the ferrite cores 10 and may constitute 300 windings of No. 42 copper wire. Prior to winding the coils 12 on the cores 10, the latter are prepared individually by wrapping several turns of Japanese tissue bonded with a high dielectric adhesive such as glyptol thereon. This wrapping which is not shown in the drawings serves to insulate the coils 12 from the cores 10. Elastic bands 13, or the like, are utilized to maintain the one ends of the cores in close abutment and the other ends in firm contact with the shim 11. Referring also to Fig. 2 the cores 10 and their coils 12 are mounted in a well 14 in one face of a disc 15 (see also Fig. 3) of suitable non-magnetic material, for example, aluminum. Well 14 is counterbored to provide an annular shoulder 16 on which the cores 11 rest, the coils 12 and the elastic bands 13 extending into the cavity between the shoulders. Preferably a thin waferlike magnetic shield 17 of mμ metal or the like is positioned in said cavity beneath the coils 12 to magnetically isolate each transducing head from its neighbors. Bores 18, connecting the well 14 with the external perimeter of the disc 15, provide access to the former for insulated leads 19, suitably secured to the ends of the coils 12.

In order for the cores 10 to cooperate with a magnetic drum, or the like, the ends thereof separated by the shim 11, project outwardly through an opening 20 in the annular wall of well 14. Preferably the configuration of the disc 15 is such that the plane of the opening 20 marks one edge thereof. Projection of the said core ends through the opening 20 is insured by the insertion of flexible spacers 22 between the wall of well 14 and concave bevels 24 provided at the outer sides of the abutting ends of the cores 10. It will be noted from Fig. 1 that the spacers 22 also serve to retain the said core ends in abutting relationship.

The cores 10 and their associated componentry are secured in the well 14 by embedding the same in a suitable plastic in the well, for example, an epoxy resin. Preferably the molded plastic is cured by baking, say 100 degrees Fahrenheit for 36 hours.

At this point, it is deemed desirable to point out that the non-magnetic shim 11 should be of the same size as the opposing faces of the cores 10 which are in contact therewith, that is, for optimum results no overlap of the shim should exist. Preferably, during construction the shim is allowed to overlap somewhat beyond the working ends of the cores 10 and then is leveled with the latter by grinding both away to a predetermined distance from a reference point in the head structure and at a predetermined angle to a reference line through said point. In the instant embodiment of the invention, the grinding is referenced to a line drawn through the centers of a pair of holes 26 in the disc 15 by which the latter is mounted relative to a drum, or the like.

In order to facilitate the assembly of a group of the heads of the invention into a unitary structure suitable for mounting relative to a recording medium, such as a drum, the face of each disc opposite its well 14 is provided with a raised portion 28 of the same configuration as and adapted to nest into the well of another head, as best shown in Fig. 2. To permit of this nesting, the plastic in which the cores 10, etc., are embedded in each well is not allowed to completely fill the well, but rather sufficient space is left for the projecting portion 28 of another head. Evidently, when a plurality of the heads are nested together the engagement of the raised portion 28 of each in the well 14 of the next aligns the same axially.

As shown in Fig. 1, by way of example, the heads may be nested together in groups of ten. Preferably each group of heads is held together by bolts 30 passed through the holes 26 in the discs. The holes 26 in the end discs 15 of each group, may be modified from the others of the group to accommodate the bolts 30, that is, the holes in one end disc may be counterbored to receive the heads of the bolts and the holes in the disc at the other end may be threaded to receive the bolts. It can be seen that this type of ganged mounting of the heads allows for ready replacement of a defective head since each is a complete unit in itself. Likewise, the capacity of a ganged head assembly can readily be changed to vary the number of heads in operation.

In order to provide for proper cooperation between each head of a group and a magnetic medium with which the heads are to be associated the grinding of the cores 10 and the shims 11 is accomplished after the heads have been secured together as a group.

Figure 3:
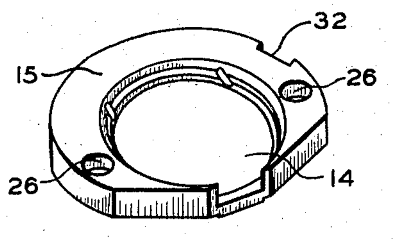
Fig. 3 is an isometric view of the basic disc forming the housing for the electro-magnetic element of the head of the invention.

In order to provide an adjustable mounting for each group of heads whereby the latter may be positioned parallel to the magnetic surface with which they are to cooperate, and at a desired distance therefrom, each disc 15 is provided with a notch 32 in its peripheral edge which is engaged by a bar 34 (Figs. 1, 2 and 3). The ganged heads are secured to the bar by a pair of bolts 38 which pass through the latter and are threaded into tapped holes 36 extending radially inward from the bases of the notches 32 of the end discs. The position of notch 32 on the periphery of disc 15, and also the shape of the bar 34 is dependent on the desired position of the transducing heads relative to the recording medium. Bar 34 is an integral extension of a mounting block 40 adjustably secured on a crossbar 42 which is substantially parallel with the recording surface with which the heads are to cooperate. The upper face of bar 42 is provided with a series of spaced, transverse notches or guideways 44, one per mounting block 40. Each mounting block is provided with a depending key 46 adapted to the slots 44 and which in cooperation with the latter, position the associated group of heads substantially parallel to the recording surface with which they are to cooperate.

Figure 4:
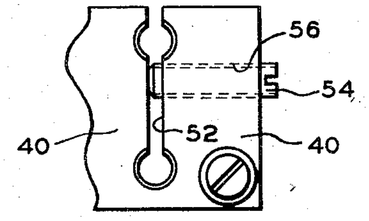
Fig. 4 is a fragmentary plan view of an adjustment means also illustrated in Fig. 1.

In order to provide for adjustment of the angular positions of the heads relative to the recording surface to obtain a desired degree of parallelism between the latter and a group of heads, bar 34 is adjustable angularly with respect to its parallelism with said surface. To this end, block 40 is divided by a vertical slot 52 which extends from one side thereof almost to the other, sufficient material being left at the closed end of the slot to constrain the edges of the slot to parallelism from a desired range of angular positions to which they may be adjusted. Also, the key 46 terminates at the slot 52 (see Fig. 5) and the bolt 50 is located on the side of slot 52 away from the bar 34 to permit the latter to be moved angularly. Adjustment of the angular relation between the edges of slot 52 and therefore adjustment of the angular position of bar 34 is accomplished by a screw 54 (see also Fig. 4) threaded into a hole 56 which extends from the face of block 40 opposite the bar 34 to the slot 52. Bolt 48, which serves along with the bolt 50, to secure block 40 to bar 42 projects downward into the bar through the slot 52 near the open end of the latter and is used also to lock the edges of the slot in whatever positions they are adjusted by screw 54. To this end a washer 60 may be placed beneath the head of bolt 48 to bear against the upper face of the block on either side of the slot.

The construction is such that rotation of screw 54 pivots the bar 34 about the closed end of slot 52 to obtain the desired degree of parallelism between the transducing heads mounted on the bar and the recording surface with which they are to cooperate. Then the bolt 48 is drawn up to secure the parts in their adjusted positions.

In order to position the heads at a desired distance from the surface with which they are to cooperate, the crossbar 42 is provided with a vertical slot 62 (see Figs. 1–5) extending throughout its lentgh and downwardly almost to the lower extremity of the slot, sufficient material being left beneath the slot to provide tension as the slot is spread, the same as described above in connection with slot 52. Additionally, the portion of the bar between the slot 62 and the transducing heads is divided lengthwise into a plurality of individually adjustable sections 64 separated by slots 66 each section being slightly wider than the associated block 40 which is mounted thereatop. Adjustment of the width of that portion of the slot 62 associated with each section 64 of the bar 42 is accomplished by means of a screw 68 threaded into a countersunk hole 70 which extends from the face of bar 42 opposite the recording medium across the slot 62. Preferably a hardened pin 72 is inserted in that portion of the hole 70 which extends beyond the slot 62 to provide an accurate bearing surface for the screw 68.

It will readily be seen that rotation of screw 68 pivots the associated section 64 of bar 42 and therefore the associated group of transducing heads about the lower end of slot 62, moving the said heads toward or away from the recording surface with which they cooperate.

In order to prevent inadvertent engagement of the heads with the surface of the recording medium as through overadjustment by screw 68, or by accidental pressure exerted on a block 40, each section 64 of bar 42 may be provided with a pair of vertical countersunk tapped holes 74, one at either side of the associated block 40, adjacent the side of the section nearest the transducing heads. Screws 82 threaded into the holes 74 serve as legs at the free end of each section 64 of bar 42 and when adjusted relative to a fixed frame member or the like such as that indicated at 78, prevent more than a desired amount of pivoting of the said section about the lower end of slot 62. The bar 42 may be supported in any suitable manner as, for example, by end brackets. Preferably, however, it is secured atop the frame member 78 by bolts 80, the sections 64 and the material beneath the slot 62 being undercut to permit adjustment of the former without interference with the frame member 78.

Referring now to Figs. 6–8 there is disclosed a modified form of the invention adapted to provide a more accurate alignment of the shims 11 of a group of heads and to provide a more accurate spacing between the cores 10 of the several heads of a group. As shown, a pair of ferrite cores 10 having coils 12 thereon, the same as described hereinabove, are mounted in a disc-like housing comprising an annulus 84 of non-magnetic material such as aluminum, and a pair of wafers 86 pressed-fit into counterbores 88 of the central cavity 90 of the annulus. Preferably, the wafers 86 are constructed of mu metal or the like to provide magnetic shielding of the cores 10 and windings 12. In order for the ends of the cores 10 separated by the shims 11 to project from the central cavity 90 of the annulus for cooperation with a recording medium, the edge of the annulus is provided with a centrally located slot 92 which intersects the wall of the cavity 90 to form an opening 94 therein. Preferably the thickness of slot 92 and opening 94 are such as to provide a snug fit for the cores 10 which project through the said opening sufficiently for their ends to extend beyond the confines of the slot 92. Here again, the ends of the said cores and the shims are ground after a group of the heads have been assembled together.

The construction is such that when a plurality of annuli 84 of substantially the same thickness are assembled together, the slots provide for a substantially constant spacing between adjacent cores 10.

In order to position the cores 10 properly relative to the opening 94 and to more securely retain the abutting ends of the cores in abutting relationship, a pair of adjustment screws 96 are threaded into tapped holes 98 in the annulus and extend into the cavity 90 for engagement with the concave bevels 102 of the cores described hereinabove. Of course, if desired, the flexible rings 22 of Fig. 1 may be substituted for the adjustment screws 96. In either event, the cores 10 are pushed together and also through the opening 94. Preferably, the cores 10 are provided with shoulders 104 which engage the wall of cavity 90 on either side of the opening 94 under pressure of the screws 96 or the flexible rings 22.

In order to retain the cores 10 and the associated components in fixed relationship within the cavity 90, the latter may be filled with a plastic such as an epoxy resin, as indicated at 106, after one of the magnetic shields 86 has been pressed into place. It is believed evident that the projection of cores 10 through the openings 94 and slots 92 effects an accurate spacing between the cores of adjacent heads.

In order to facilitate alignment of the shims 11 of a plurality of adjacent heads, each annulus 84 is divided semiannularly in line with the shim 11 for the cores 10 mounted therein. One division of each annulus is slightly thicker than the other, providing shoulders 108 on either face thereof against which similar shoulders of other annuli may abut. Obviously the abutment of the shoulders of adjacent heads aligns the shims 11 thereof.

Preferably groups of annuli 84 are secured together by bolts 30 in the same manner as described hereinabove in connection with the disc 15. Also, these groups of heads may be adjustably supported as indicated in Fig. 1 and as described hereinabove. It is not deemed necessary, however, to re-describe the said supporting means. It is to be mentioned that, if desired, the heads of the invention may be mounted individually rather than in groups. Also, if desired, the described ferrite pole pieces may be replaced by one-piece ferrite cores having a gap machined therein or other suitable core structures.

It will be seen, therefore, that there has been disclosed a novel disc-like magnetic recording head capable of being ganged at an extremely fine spacing, yet providing adequate shielding between adjacent heads, and facilitating ready replacement of faulty heads and changes in the capacity of a head assembly. The means also comprise novel adjustable support for the heads whereby the latter are positionable as required for optimum recording results. In addition, the transducing head design is conducive of the production of a head having uniform electrical characteristics, i.e. inductance and Q.

While there have been above described a limited number of embodiments of the invention, it is believed evident that many modifications and additions thereto may be made without departing from the spirit of the invention. It is not desired, therefore, to limit the scope of the invention except as pointed out in the appended claims or as described by the prior art.

We claim:

1. The combination of a flat, disc-like plate of non-magnetic material having a large cavity therein and an opening in the wall of the cavity to the edge of the plate, a magnetic transducing structure mounted in the cavity and extending through said opening, a magnetic shielding wafer mounted in said cavity aside said structure, a plastic block molded in said cavity and securing the said structure therein and means for mounting said plate in position for the transducing structure to cooperate with a magnetic recording medium.

2. The combination according to claim 1 wherein said plate is provided with a shoulder engageable by another plate to align the two.

3. The combination according to claim 2 wherein the said shoulder is of the same configuration as the cavity and engages in the cavity of the said other plate.

4. The combination according to claim 2 wherein a said shoulder is provided on either face of said plate and extends diametrically of said plate.

5. The combination of a plurality of flat, disc-like plates of non-magnetic material each having a large cavity therein and an opening in the wall of the cavity to the edge of the plate, a magnetic transducing structure mounted in each cavity and extending through the said opening, a magnetic shielding wafer mounted in each cavity aside said structure, a plastic block molded in each cavity and securing the said structure therein, means securing said plates together as a unit with the said transducing structures aligned, aligned notches in the edges of said plates, and means engaging said notches for securing the unit in position relative to a magnetic recording medium.

6. The combination according to claim 5 wherein the last said means comprises a block having an extension secured in said notches, a crossbar extending axially of the said plates and substantially parallel to the recording medium, said bar being divided longitudinally by a deep slot, and one side of the bar being divided into sections by slits extending transversely of the slots of each section being adapted to support a said block, and means for adjusting the width of the open end of the slot adjacent each said section to move the unit associated therewith toward and away from the recording medium.

7. The combination according to claim 6 wherein said block is divided by a slot which extends laterally almost across the block, a keyway in the surface of each section of said bar, a key projecting from said block on the side of the slot away from the extension of the block and engaged in said keyway, and means for adjusting the width of the open mouth of the slot to adjust the degree of parallelism between the extension of the block and the recording medium.

8. The combination according to claim 7 and including a fixed member and a pair of screws threaded through each said section of the cross bar and engaging said fixed member to prevent widening of the slot in said bar adjacent section.

9. The combination according to claim 8 wherein each said magnetic transducing structure comprises a pair of opposed approximately C-shaped ferrite pole pieces having their one ends abutting and their other ends projecting through the opening in the wall of said plate, a thin non-magnetic shim positioned between the said other ends of the pole pieces, a pair of resilient bands tensioning the pole pieces toward one another, a pair of coils wound on said pole pieces, means urging the pole pieces through said opening, and leads wired to said coils and extending out of the cavity through holes in the wall thereof.

10. The combination according to claim 9 wherein the said cavity in each plate comprises a well in one face of the plate, and the opposite face of the plate is provided with a raised portion aligned with and of the same configuration as the well, said raised portion engaging in the well of the next plate of the unit.

11. The combination according to claim 9 wherein each plate comprises an annulus surrounding said cavity and said opening comprises a slit in the edge of the annulus.

12. The combination according to claim 9 wherein the said cavity in each plate comprises a counterbored well in one face of the plate, and the opposite face of the plate is provided with a raised portion aligned with and of the same configuration as the well, and engaging in the well of the next plate of the unit, the pole pieces being located in the counterbored portion of the well, and including a magnetic shielding wafer located in the narrower portion of the well.

13. The combination according to claim 9 wherein each plate comprises an annulus surrounding said cavity, the latter is counterbored at either face of the plate, and said opening comprises a slit in the edge of said annulus, and including magnetic shielding wafers affixed in each counterbore.

14. The combination according to claim 13 wherein the means for urging the pole pieces through the opening comprise a pair of set screws threaded through the annulus.

15. The combination with one or more magnetic transducing heads of means for mounting the same in relation to a magnetic recording medium comprising a block having an extension secured to the heads, a crossbar extending axially of the said heads and substantially parallel to the recording medium, said bar being divided longitudinally by a deep slot, and one side of the bar being divided into sections by slits extending transversely of the slots, each section being adapted to support a said block, and means for adjusting the width of the open end of the slot adjacent each said section to move the heads associated therewith toward and away from the recording medium.

16. The combination according to claim 15 wherein said block is divided by a slot which extends laterally almost across the block, a keyway in the surface of each section of said bar, a key projecting from said block on the side of the slot away from the extension of the block and engaged in said keyway, and means for adjusting the width of the open mouth of the slot to adjust the degree of parallelism between the extension of the block and the recording medium.

17. The combination according to claim 16 and including a fixed member and a pair of screws threaded through each said section of the cross bar and engaging said fixed member to prevent widening of the slot in said bar adjacent said section.

18. The combination of a non-magnetic, flat disc-like annulus surrounding a hole counterbored at either face of said annulus and having a slot in one edge which forms an opening to the hole, a magnetic transducing structure mounted in the hole and extending through said opening, a plastic block molded in said hole and securing said structure therein, magnetic shielding wafers secured in said counterbores, and means for mounting the annulus in position for the transducing structure to cooperate with a magnetic recording medium.

19. The combination according to claim 18 wherein each said magnetic transducing structure comprises a pair of opposed approximately C-shaped ferrite pole pieces having their one ends abutting and their other ends projecting through the opening in the annulus, a thin non-magnetic shim positioned between the said other ends of the pole pieces, a pair of resilient bands tensioning the pole pieces toward one another, a pair of coils wound on said pole pieces, means urging the pole pieces through said opening, and leads wired to said coils and extending out of the hole through holes in the annulus.

References Cited in the file of this patent

UNITED STATES PATENTS

| | | |
|---|---|---|
| 2,587,097 | Berlant | Feb. 26, 1952 |
| 2,592,652 | Buhrendorf | Apr. 15, 1952 |
| 2,621,259 | Grantham | Dec. 9, 1952 |
| 2,628,286 | Rettinger | Feb. 10, 1953 |
| 2,640,886 | Davis | June 2, 1953 |
| 2,644,856 | Pettus | July 7, 1953 |
| 2,662,120 | Anderson | Dec. 8, 1953 |
| 2,756,280 | Rettinger | July 24, 1956 |
| 2,769,036 | Selsted | Oct. 30, 1956 |

FOREIGN PATENTS

| | | |
|---|---|---|
| 1,036,256 | France | Apr. 22, 1953 |
| 695,150 | Great Britain | Aug. 5, 1953 |

UNITED STATES PATENT OFFICE

CERTIFICATE OF CORRECTION

March 31, 1959

Patent No. 2,880,280

Lawrence H. Gernert et al.

It is hereby certified that error appears in the printed specification of the above numbered patent requiring correction and that the said Letters Patent should read as corrected below.

Column 6, line 42, after "slots" strike out "of"; line 60, after "adjacent" insert -- said --.

Signed and sealed this 14th day of July 1959.

(SEAL)

Attest:
KARL H. AXLINE

Attesting Officer

ROBERT C. WATSON
Commissioner of Patents